(12) United States Patent
Behrens et al.

(10) Patent No.: US 9,182,175 B2
(45) Date of Patent: Nov. 10, 2015

(54) ANTI-ICING HEAT EXCHANGER

(75) Inventors: William W. Behrens, St. Louis, MO (US); Andrew R. Tucker, Glendale, MO (US)

(73) Assignee: The Boeing Company, Chicago, IL (US)

( * ) Notice: Subject to any disclaimer, the term of this patent is extended or adjusted under 35 U.S.C. 154(b) by 762 days.

(21) Appl. No.: 13/309,190

(22) Filed: Dec. 1, 2011

(65) Prior Publication Data

US 2013/0140004 A1    Jun. 6, 2013

(51) Int. Cl.
*F28F 13/12* (2006.01)
*F28F 9/00* (2006.01)
*F28D 7/02* (2006.01)
*F28D 7/00* (2006.01)
*B64D 13/00* (2006.01)
*F28F 13/00* (2006.01)
*F28F 19/00* (2006.01)

(52) U.S. Cl.
CPC ............. *F28D 7/0025* (2013.01); *B64D 13/00* (2013.01); *F28F 13/003* (2013.01); *F28F 19/006* (2013.01); *F28F 2265/14* (2013.01)

(58) Field of Classification Search
CPC ............ A23L 3/22; F28F 1/003; F28F 1/325; H01L 23/427; F28D 15/00; F28D 1/0477
USPC ........... 165/66, 70, 104.19, 104.21, 119, 150, 165/151
See application file for complete search history.

(56) References Cited

U.S. PATENT DOCUMENTS

| | | | |
|---|---|---|---|
| 3,557,557 A | | 1/1971 | Prachar |
| 4,333,522 A | * | 6/1982 | Brune .............................. 165/69 |
| 5,752,566 A | * | 5/1998 | Liu et al. ........................ 165/110 |
| 6,158,242 A | * | 12/2000 | Lu .................................... 62/637 |
| 6,203,587 B1 | * | 3/2001 | Lesieur ................ B01J 19/2485 422/203 |
| 6,716,782 B2 | | 4/2004 | Heng et al. |
| 7,501,111 B2 | * | 3/2009 | Keller ................. C01B 17/0439 165/138 |
| 7,742,297 B2 | | 6/2010 | Behrens et al. |
| 9,074,829 B2 | * | 7/2015 | Behrens ................ F28F 13/003 |
| 2004/0245389 A1 | | 12/2004 | Behrens et al. |

(Continued)

FOREIGN PATENT DOCUMENTS

EP    0510734    10/1992

OTHER PUBLICATIONS

European Search Report for EP12194996, dated May 3, 2013.

(Continued)

*Primary Examiner* — Frantz Jules
*Assistant Examiner* — Claire Rojohn, III

(57) ABSTRACT

A heat exchanger for cooling fluid passing through the heat exchanger. The heat exchanger includes a hot fluid flowpath and a cold air flowpath. At least a portion of the cold air flowpath has a thermally conductive wall transferring thermal energy from hot fluid flowing through the hot fluid flowpath to cold air flowing through the cold air flowpath. The cold air flowpath includes a separator for separating ice particles from the cold air flowing through the cold air flowpath. The separator includes a passage having a bottom wall, an end wall, and a side wall including a porous wall through which a majority of cold air entering the separator passes. The end wall has an ice particle discharge opening adjacent the bottom wall permitting a minority of the cold air entering the separator to carry ice particles separated from the majority of cold air through the opening.

16 Claims, 4 Drawing Sheets

(56) References Cited

U.S. PATENT DOCUMENTS

| | | |
|---|---|---|
| 2005/0095476 A1 | 5/2005 | Schrooten et al. |
| 2007/0074859 A1 | 4/2007 | Nakada |
| 2008/0000630 A1* | 1/2008 | Haglid .......................... 165/287 |
| 2008/0110416 A1* | 5/2008 | Gelderloos ............... F24H 1/36 122/18.3 |
| 2008/0277104 A1 | 11/2008 | Aoki et al. |
| 2008/0289802 A1* | 11/2008 | Nakajima et al. ........ 165/104.31 |
| 2009/0000328 A1 | 1/2009 | Scherer et al. |
| 2009/0250191 A1* | 10/2009 | Klein .................... F28F 13/003 165/44 |
| 2009/0288814 A1 | 11/2009 | Stoia et al. |
| 2010/0006273 A1* | 1/2010 | Du et al. ........................ 165/165 |
| 2010/0038051 A1* | 2/2010 | Behrens et al. ................. 165/41 |
| 2011/0133026 A1 | 6/2011 | Behrens et al. |

OTHER PUBLICATIONS

European Search Report for EP12194996, dated Feb. 13, 2015.

* cited by examiner

ANTI-ICING HEAT EXCHANGER

BACKGROUND

The present disclosure generally relates to heat exchangers, and more particularly, to a heat exchanger having anti-icing provisions.

Aircraft use cooling systems to manage thermal loads resulting from equipment operation. These cooling systems frequently include heat exchangers having separate hot and cold flowpaths. Heat from fluid in the hot flowpath is transferred to fluid in the cold flowpath, thereby cooling the fluid in the hot flowpath and heating the fluid in the cold flowpath. For example, air from compartments having equipment giving off heat can be directed through the hot flowpath and air from a cooling turbine of an air cycle machine (i.e., a refrigeration unit) can be directed through the cold flowpath. The heat exchanger transfers thermal energy from the hot flowpath air to the cold flowpath air, thereby cooling the air from the equipment compartment. The cooled air is returned to the equipment compartment, cooling the equipment to ensure proper performance.

Air entering conventional heat exchangers from cooling turbines must be maintained at a temperature above a freezing temperature of water to prevent ice from accumulating on surfaces of the cold flowpath in the heat exchanger. If the temperature of the air entering the heat exchanger is below the freezing temperature of water, multiple layers of ice can accumulate on surfaces along the cold flowpath. These layers of ice impair the heat exchanger by increasing power required to pump air through the heat exchanger and insufficiently cooling fluid in the hot flowpath. However, if colder air could be used in the heat exchanger without ice accumulating, then the air cycle machine efficiency could be increased and the heat exchanger size and weight could be reduced. Thus, there is a need for a heat exchanger that reduces the potential for ice accumulation.

SUMMARY

In one aspect, the present disclosure includes a heat exchanger for cooling fluid passing through the heat exchanger. The heat exchanger comprises a hot fluid flowpath for carrying a hot fluid from a hot fluid inlet to a hot fluid outlet downstream from the hot fluid inlet. At least a portion of the hot fluid flowpath is defined by a thermally conductive wall permitting thermal energy to transfer from hot fluid flowing through the hot fluid flowpath. The heat exchanger further comprises a cold air flowpath for carrying a cold air from a cold air inlet to a cold air outlet downstream from the cold air inlet. At least a portion of the cold air flowpath is defined by the thermally conductive wall permitting thermal energy to transfer from the hot fluid flowing through the hot fluid flowpath to cold air flowing through the cold air flowpath. The cold air flowpath includes a separator for separating ice particles from the cold air flowing through the cold air flowpath. The separator includes a passage having a bottom wall, an end wall, and a side wall defined at least in part by a porous wall through which a majority of cold air entering the separator passes. The end wall has an ice particle discharge opening adjacent the bottom wall permitting a minority of the cold air entering the separator to carry ice particles separated from the majority of cold air through the opening.

In another aspect, the present disclosure includes a heat exchanger for cooling air passing through the heat exchanger. The heat exchanger comprises a thermally conductive hot air conduit for carrying hot air from a hot air inlet to a hot air outlet downstream from the hot air inlet. The heat exchanger further comprises a cold air flowpath for carrying a cold air from a cold air inlet to a cold air outlet downstream from the cold air inlet. The cold air flowpath includes an upstream passage having a bottom wall, a porous side wall, and an end wall including an ice particle discharge opening adjacent the bottom wall. A majority of cold air entering the cold air inlet passes through the porous side wall and enters a downstream passage in thermal communication with the hot air conduit so thermal energy transfers from hot fluid flowing through the hot fluid flowpath to cold air flowing through the downstream passage of the cold air flowpath. A minority of cold air entering the cold air inlet sweeping ice particles through the discharge opening and out of the heat exchanger.

In still another aspect, the present disclosure includes a heat exchanger for cooling air passing through the heat exchanger. The heat exchanger comprises a cold air flowpath for carrying a cold air from a cold air inlet to a cold air outlet downstream from the cold air inlet. The cold air flowpath includes an upstream passage having a bottom wall, a foam side wall, and an end wall including an ice particle discharge opening adjacent the bottom wall. A majority of cold air entering the cold air inlet passes through the foam side wall and enters a downstream passage having a thermally conductive wall in thermal communication with hot fluid for transferring thermal energy from hot fluid to cold air flowing through the downstream passage of the cold air flowpath. A minority of cold air entering the cold air inlet sweeps ice particles through the discharge opening and out of the heat exchanger.

Other aspects of the present disclosure will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
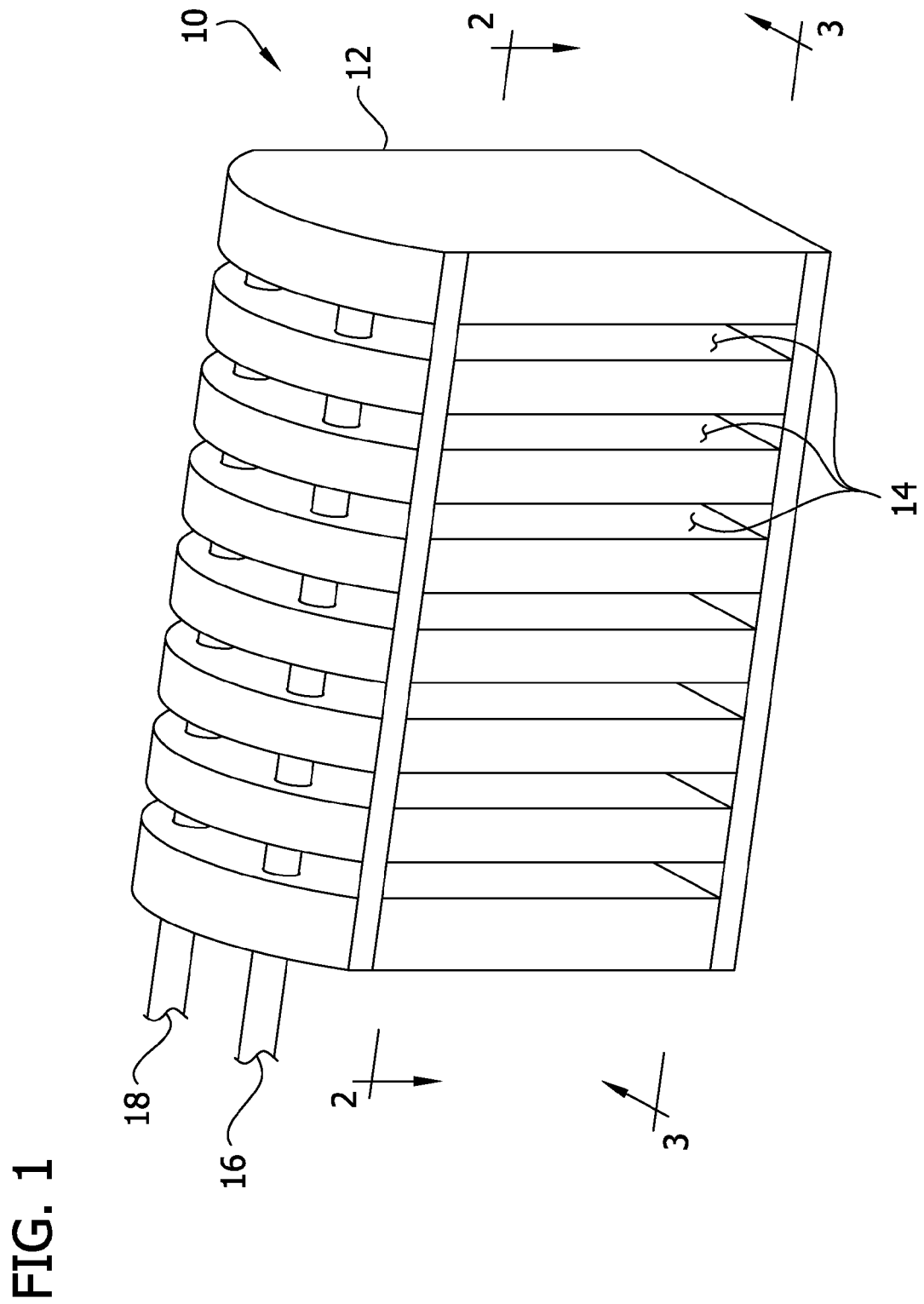
FIG. 1 is a perspective of a heat exchanger of the present embodiment.

Referring to FIG. 1, a heat exchanger incorporating one embodiment is designated in its entirety by the reference number 10. The heat exchanger 10 has a casing 12 including a plurality of cold air inlets 14 for receiving cold air (e.g., cold air from a cooling turbine), a hot fluid inlet 16 for receiving hot fluid (e.g., hot air from a cabin or a compartment having equipment), and a hot fluid outlet 18 for discharging the hot fluid after being cooled by the heat exchanger. The cold air exits the heat exchanger 10 through cold air outlets 20 (FIG. 2) and ice particle discharge openings 22 (FIG. 3) downstream from the cold air inlets 14. In one embodiment, the casing 12 is made from aluminum sheet having a thickness of about 0.0625 inch.

Figure 2:
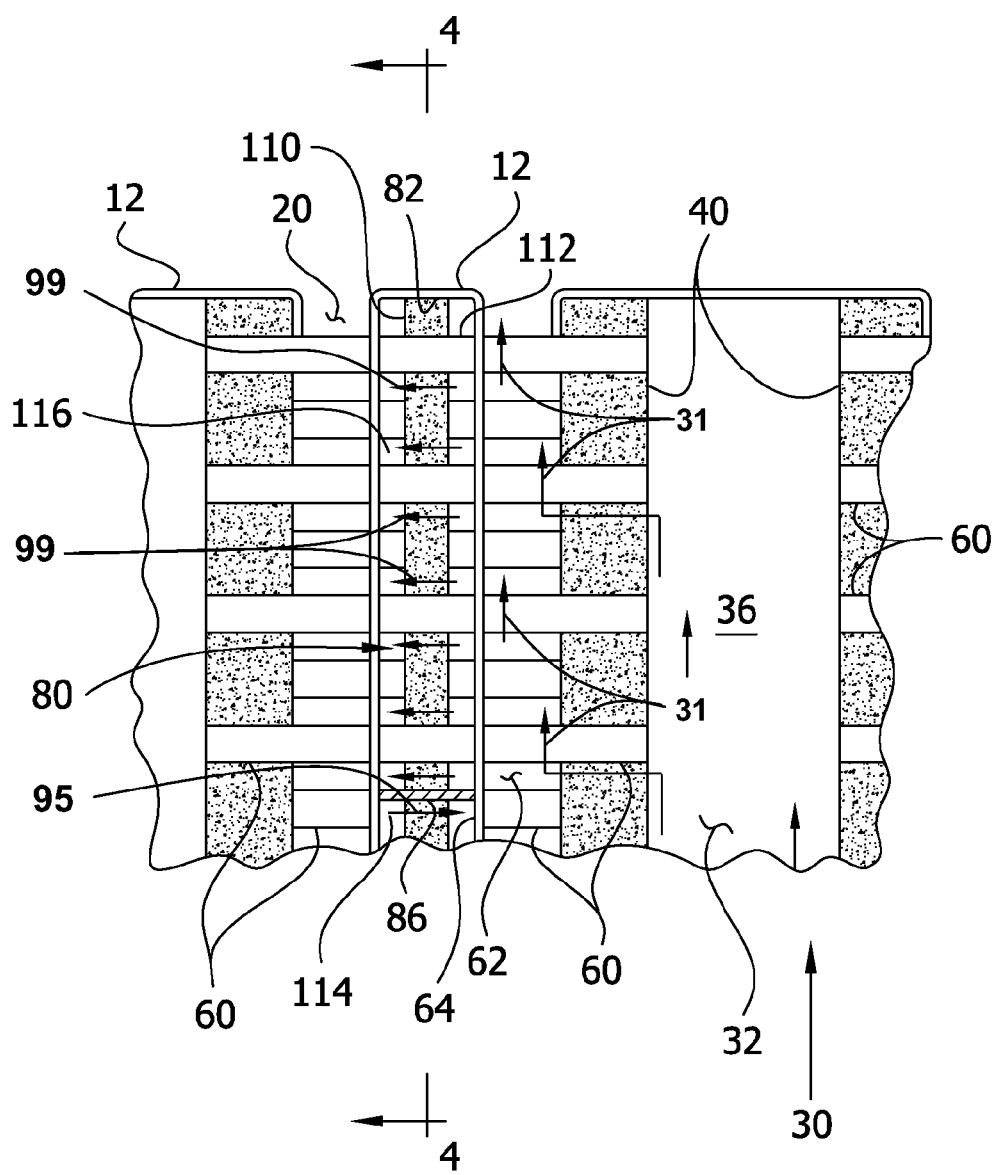
FIG. 2 is a horizontal cross section of the heat exchanger taken in the plane of line 2-2 of FIG. 1.
Figure 3:
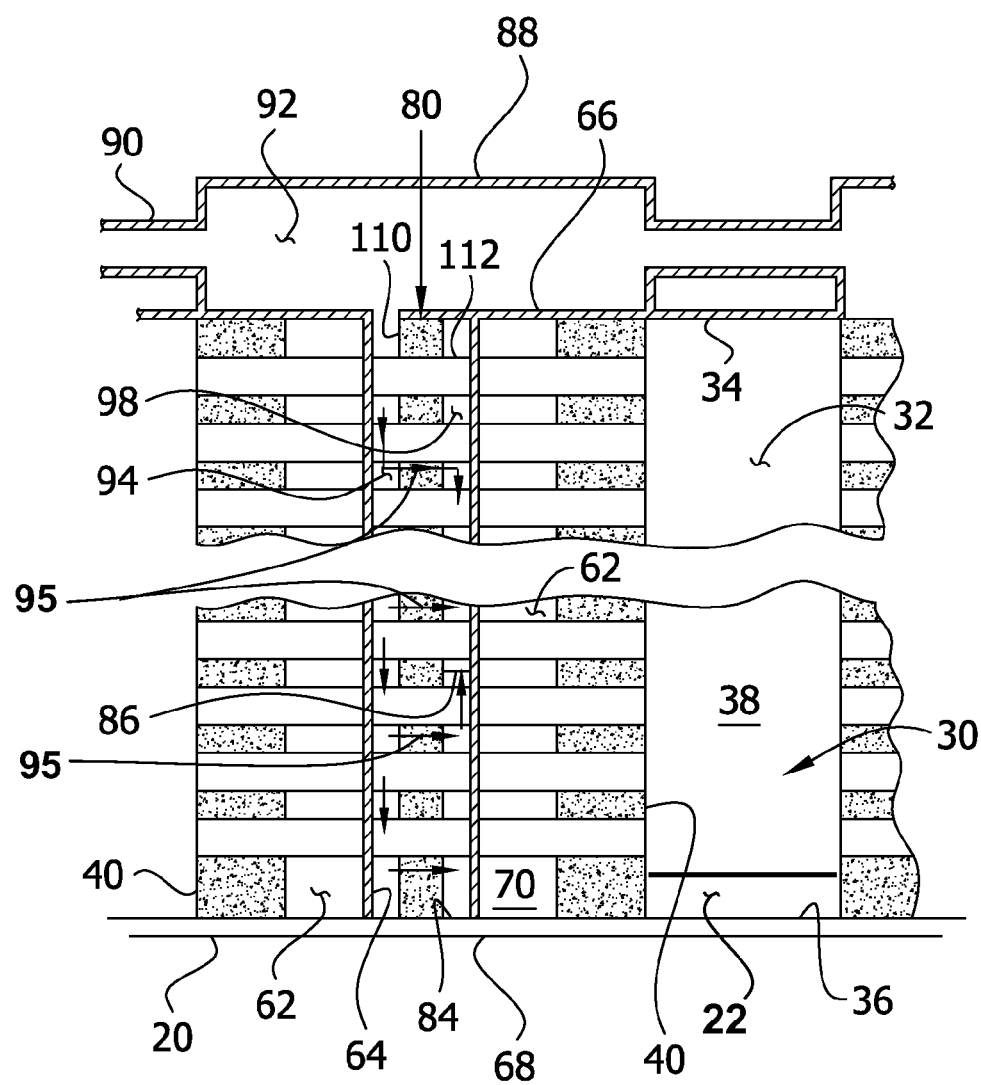
FIG. 3 is a vertical cross section of the heat exchanger taken in the plane of line 3-3 of FIG. 1.

As illustrated in FIGS. 2 and 3, cold air entering the heat exchanger 10 through the cold air inlets 14 travels along a cold air flowpath, generally designated by 30, to the corresponding cold air outlet 20. The cold air flowpath 30 is defined by an upstream passage 32 having a top wall 34, a bottom wall 36, an end wall 38, and opposing side walls 40.

The top wall 34, bottom wall 36, and end wall 38 form at least a portion of the casing 12. As illustrated in FIG. 3, the end wall 38 ends above the bottom wall 36 to form the ice particle discharge openings 22. The opposing side walls 40 comprise a thermally conductive porous ceramic foam panel. In one embodiment the side walls 40 comprise Boeing Rigid Insulation (BRI). BRI is a hyper-porous, micro-channel ceramic foam having a pore size of about 35 microns and over 31,350 square feet of internal surface area per cubic foot. As will be appreciated by those skilled in the art, the large internal surface area of BRI provides good convective heat transfer. Further, BRI has a thermal conductivity of about 0.05 BTU/hr-ft-° R. BRI is available from The Boeing Company of Chicago, Ill. The rigid insulation has a high surface area, providing good heat transfer to the cold air passing through the rigid insulation. In one embodiment, the insulation has a thickness of about 0.150 inch. Boeing Rigid Insulation is described in more detail in U.S. Pat. No. 6,716,782.

As will be apparent to those skilled in the art, most of the air entering the cold air inlet 14 turns and passes through the porous side wall 40. Any ice particles in the air are carried by their greater momentum to the end wall 38. The ice particles strike the end wall 38 and fall under the influence of gravity to the bottom wall 36 where air sweeps the particles and droplets through the discharge openings 22. Only a small fraction of air entering the cold air inlet 14 exits through the ice particle discharge opening 22. Most of the air passes through the side walls 40.

Thermally conductive elements 60 extend through the ceramic foam walls 40 at spaced intervals. In one embodiment, the thermally conductive elements 60 are made of aluminum nitride that is injected as a liquid into holes formed in the ceramic foam. Further, in one embodiment the elements 60 are cylindrical pins or rods having a diameter of about 0.141 inch. In one embodiment, the elements 60 are arranged in staggered rows. Although the elements may have another spacing, in one embodiment the elements in each row are vertically spaced about 0.49 inch apart and each row is spaced about 0.245 inch from adjacent rows. This element 60 size and spacing reduce the flow area through the porous side walls 40 by about twelve percent. The elements 60 span a downstream passage 62 formed between the foam side wall 40 and a thermally conductive wall 64. In one embodiment, the elements 60 are connected (e.g., with aluminum nitride) to the thermally conductive wall 64. Although the thermally conductive wall 64 may be made of other materials, in one embodiment the wall is made from aluminum nitride and alumina-silica cloth. The downstream passage 62 also includes a top wall 66, a bottom wall 68, and an end wall 70. The top wall 66, bottom wall 68, and end wall 70 form part of the casing 12.

Figure 4:
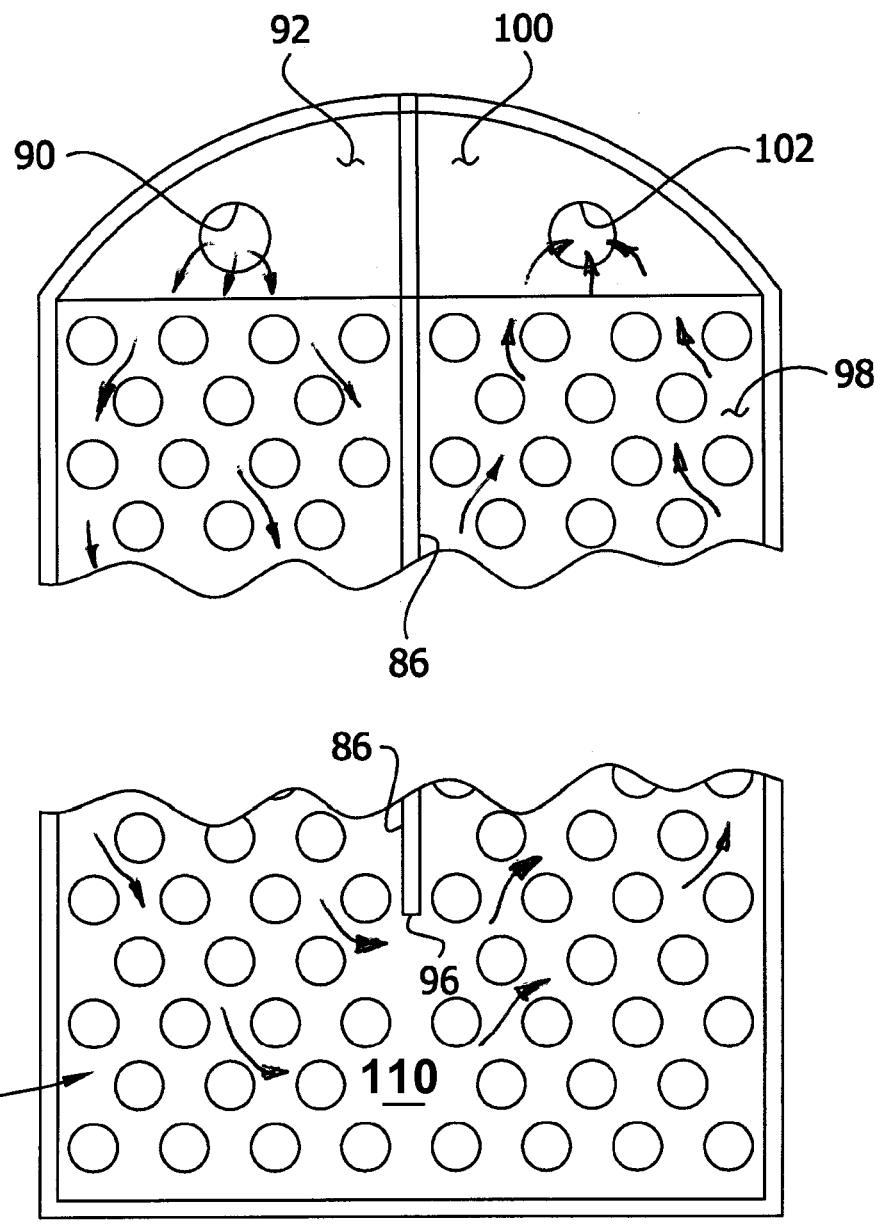
FIG. 4 is a vertical cross section of a hot fluid conduit taken in the plane of line 4-4 of FIG. 3.

As illustrated in FIGS. 2-4, a hot fluid flowpath, generally designated by 80, is formed between opposing thermally conductive walls 64 and opposing end walls 82. A bottom wall 84 closes a lower end of the hot fluid flowpath 80. A porous foam panel 110 having spaced thermally conductive elements 112 distributed over the panel and extending through the panel and out from each face is positioned in the hot fluid flowpath 80 such that the conductive elements 112 are bonded to the opposing thermally conductive walls 64. Although the panel 110 may be made of other materials and have other thicknesses, in one embodiment the porous panel comprises BRI having a thickness of about 0.150 inch. Although the thermally conductive elements 112 may be made of other materials, in one embodiment the thermally conductive elements are made of the same material as the thermally conductive elements 60 of the cold side. Further, the thermally conductive elements 112 of one embodiment have the same diameter and spacing as the elements 60 of the cold side. Although the elements 112 may extend beyond the panel 110 by other distances, in one embodiment the elements extend about 0.125 inch from each face. A dividing wall 86 extends from a top wall 88 to the bottom wall 84 on the side of the porous panel 110 open to an upstream chamber 92 but only extends to a location above the bottom wall 84 on the opposite side of the porous panel. The dividing wall 86 divides the hot fluid flowpath 80 into an inlet side 94 and an outlet side 98.

Referring to FIGS. 1-4, hot fluid entering the hot fluid inlet 16 travels through tubing 90 to an upstream chamber 92. The hot fluid flows through an inlet 114 and downward through an upstream section 114 of the hot fluid flowpath 80. The hot fluid is nearly evenly distributed across the surface of the porous panel 110 due to the relatively high flow resistance of the panel. The hot fluid passes through the porous panel 110 along a first hot fluid direction 95 and continues downward on the other side, eventually turning around a lower end 96 of the dividing wall 86. The hot fluid travels upward through a downstream section 98 of the hot fluid flowpath. Again, the fluid is almost evenly distributed across the surface of the porous panel 110. The hot fluid passes through the porous panel 110 again along a second hot fluid direction 99 as it travels upward. Finally, the hot fluid travels through the downstream section 98, out an outlet 116, and into the downstream chamber 100. From the downstream chamber 100, the hot fluid travels through tubing 102 and out the hot fluid outlet 18. As the hot fluid travels through the hot fluid flowpath 90, heat is transferred to the cold flowpath by convection to the porous material and conduction from the porous material through the conductive elements 112 to the walls 64, and by direct convection to the conductive elements, then conduction to the walls 64, and finally, by direct convection to the walls 64 themselves.

Cold air entering the cold air inlet 14 travels through the upstream passage 32 generally parallel to the porous side walls 40. A majority of cold air entering the inlet 14 turns orthogonally and travels through one of the opposing porous foam side walls 40 where it absorbs thermal energy from the BRI ceramic foam. This thermal energy is conducted from the wall 64 to the ceramic foam panels 40 by the thermally conductive elements 60. The fluid becomes rarefied when forced through the BRI, decreasing fluid friction and the associated pressure drop. After exiting the porous foam side walls 40, the cold air turns orthogonally again and travels along a first direction 31 through the downstream passage 62 generally parallel to the thermally conductive wall 64 where it absorbs more thermal energy by direct convective heat transfer from both the thermally conductive elements 60 and the conductive wall 64.

As previously stated, a majority of cold air entering the inlet 14 travels through one of the opposing foam side walls 40. Although the majority of cold air traveling through the porous foam side walls 40 may constitute other percentages of the cold air entering the inlet 14, in one embodiment the majority constitutes at least 80 percent of the cold air entering the inlet. In another embodiment, the majority constitutes at least 90 percent of the cold air entering the inlet 14, and in still another embodiment, the majority constitutes at least 95 percent of the cold air entering the inlet. The remainder of the cold air travels through the upstream passage 32 and out through the ice particle discharge opening 22 at the bottom of the end wall 38.

In the event ice particles or water droplets enter the cold air inlet 14, the momentum of the particles and droplets prevents them from turning orthogonally into the foam. Further, the pore size of the foam prevents ice particles from flowing through the foam. Instead of entering the foam, the ice particles and water droplets travel to the end wall 38 where they impinge on the wall. After striking the wall, gravity causes the particles and droplets to fall to the bottom wall 36. The cold air traveling through the ice particle discharge opening 22 sweeps the ice particles and droplets out through the opening and into fluid streams exiting the cold air outlets 20. Thus, the upstream passage 32 forms a separator for separating ice particles from the cold air.

The ice separator formed by the upstream passage 32 allows the heat exchanger 10 to be used with cold air having a temperature below a freezing temperature of water. Conventionally, the heat exchanger design would be limited to having cold air above the water freezing temperature to avoid ice accumulating in the heat exchanger. The colder air allows a smaller, lighter heat exchanger to be used to transfer a predetermined amount of heat from the hot fluid to the cold fluid. The reduced heat exchanger size and weight reduces fuel consumption and increases aircraft range.

As will be appreciated by those skilled in the art, the porous side walls 40 provide large surface areas that cause air traveling through the side walls to be at a low velocity. Further, the porous side walls 40 provide a low pressure differential across the walls.

Having described the embodiments in detail, it will be apparent that modifications and variations are possible without departing from the scope defined in the appended claims.

When introducing elements of the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods, it is intended that all matter contained in the above description and shown in the accompanying drawings shall be interpreted as illustrative and not in a limiting sense.

What is claimed is:

1. A heat exchanger for cooling fluid passing through the exchanger, the heat exchanger comprising:
    a casing;
    a spaced pair of thermally conductive walls included with the casing;
    a porous foam panel positioned in spaced relation between the pair of thermally conductive walls and defining a gap between one of the thermally conductive walls and the porous foam panel, the gap defining a hot fluid flowpath inside the gap for carrying a hot fluid from a hot fluid inlet and passing through the porous foam panel to a hot fluid outlet downstream from the hot fluid inlet;
    a porous side wall positioned in spaced, parallel relation to the thermally conductive wall defining the gap and located on a side of the thermally conductive wall opposite the porous foam panel, the porous side wall separating an upstream passage from a downstream passage of a cold air flowpath for carrying a cold air from a cold air inlet to a cold air outlet, the thermally conductive wall permitting thermal energy to transfer from the hot fluid flowing through the gap along one side of the thermally conductive wall to the cold air flowing along an opposite side of the thermally conductive wall;
    a bottom wall and the porous side wall collectively defining the upstream passage of the cold air flowpath arranged such that the cold air flows parallel to the porous side wall after entering the cold air inlet, strikes an end wall, and turns orthogonal and passes through the porous side wall and again turns orthogonal and flows parallel to the porous side wall and the thermally conductive wall after passing through the porous side wall;
    the end wall being located opposite the cold air inlet and configured to separate ice particles from the cold air upon the ice particles striking the end wall and falling to the bottom wall, the end wall having an ice particle discharge opening adjacent the bottom wall permitting a minority of the cold air entering the cold air inlet to carry the ice particles through the ice particle discharge opening and out of the heat exchanger.

2. The heat exchanger as set forth in claim 1 wherein:
    the porous side wall comprises a foam panel.

3. The heat exchanger as set forth in claim 2 wherein:
    the foam panel comprises a ceramic foam.

4. The heat exchanger as set forth in claim 1 wherein:
    the majority of the cold air flows past the thermally conductive wall of the cold air flowpath in a first direction after passing through the porous side wall; and
    the hot fluid flows past the thermally conductive wall of the hot fluid flowpath in a second direction orthogonal to the first direction.

5. The heat exchanger as set forth in claim 4 wherein:
    the hot fluid flowing past the thermally conductive wall of the hot fluid flowpath turns in a third direction generally opposite the second direction.

6. The heat exchanger as set forth in claim 1 wherein:
    the majority of the cold air flows along the thermally conductive wall of the cold air flowpath after passing through the porous side wall.

7. The heat exchanger as set forth in claim 1 further comprising:
    thermally conductive elements extending from the porous side wall, through the cold air flowpath downstream from the porous side wall, and into thermal contact with the thermally conductive wall of the cold air flowpath.

8. The heat exchanger as set forth in claim 7 wherein:
    the thermally conductive elements comprise aluminum nitride pins.

9. The heat exchanger as set forth in claim 1 further comprising:
    thermally conductive elements extending from the thermally conductive wall of the hot fluid flowpath into the hot fluid flowpath.

10. The heat exchanger as set forth in claim 7 wherein:
    the thermally conductive elements extending into the hot fluid flowpath comprise aluminum nitride pins.

11. The heat exchanger as set forth in claim 1 wherein:
    the thermally conductive wall of the hot fluid flowpath and the thermally conductive wall of the cold air flowpath are unitary.

12. A heat exchanger for cooling air passing through the heat exchanger, the heat exchanger comprising:
    a casing;
    a thermally conductive wall included with the casing;
    a porous foam panel positioned in spaced relation to the thermally conductive wall and defining a gap between the porous foam panel and the thermally conductive wall, the gap defining a thermally conductive hot air conduit inside the gap for carrying hot air from a hot air inlet and passing through the porous foam panel to a hot air outlet downstream from the hot air inlet;
    a porous side wall positioned in spaced, parallel relation to the thermally conductive wall defining the gap and located on a side of the thermally conductive wall opposite the porous foam panel, the porous side wall separating an upstream passage from a downstream passage of a cold air flowpath for carrying a cold air from a cold air inlet to a cold air outlet, the thermally conductive wall transferring thermal energy from the hot air flowing through the gap along one side of the thermally conductive wall to the cold air flowing along an opposite side of the thermally conductive wall;

a bottom wall and the porous side wall collectively defining the upstream passage of the cold air flowpath arranged such that the cold air flows parallel to the porous side wall after entering the cold air inlet, strikes an end wall, and turns orthogonal and passes through the porous side wall and again turns orthogonal and flow parallel to the porous side wall and the thermally conductive wall after passing through the porous side wall;

the end wall being located opposite the cold air inlet and configured to separate ice particles from the cold air upon the ice particles striking the end wall and falling to the bottom wall, the end wall including an ice particle discharge opening adjacent to the bottom wall permitting a minority of cold air entering the cold air inlet to carry the ice particles through the ice particle discharge opening and out of the heat exchanger.

13. The heat exchanger as set forth in claim 12 wherein:
the hot air conduit comprises walls constructed from aluminum nitride and alumina-silica cloth.

14. The heat exchanger as set forth in claim 13 wherein:
a portion of the walls constructed from aluminum nitride and alumina-silica cloth form a portion of the downstream passage of the cold air flowpath.

15. The heat exchanger as set forth in claim 12 wherein:
the cold air entering the cold air inlet passing through the porous side wall and entering the downstream passage comprises at least eighty percent of the cold air entering the cold air inlet.

16. The heat exchanger as set forth in claim 12 wherein:
the cold air entering the cold air inlet passing through the porous side wall and entering the downstream passage comprises at least ninety percent of the cold air entering the cold air inlet.

* * * * *